Patented May 8, 1951

2,552,059

UNITED STATES PATENT OFFICE 2,552,059

PRESERVATION OF GREEN FODDER

Georg Pfuetzer and Oskar Flieg, Limburgerhof, Germany

No Drawing. Application October 13, 1949, Serial No. 121,230. In Germany March 7, 1949

5 Claims. (Cl. 99—8)

This invention relates to improvements in the preservation of green-fodder.

It has already been suggested in the art of preserving green-fodder to use such substances as preserving agents from which nitrogen oxide is split off under preserving conditions in the acid medium of the green-fodder. The substances suggested also include nitrates which are to be used either alone or in admixture with other mineral salts. Preserving agents containing nitrates, however, have not so far gained any importance in practical use.

We have now found that mixtures of nitrates and aluminum salts of formic acid have a good preserving action on green-fodder, even when added in slight percentages. These mixtures are fast in storage and soluble in water; they form a remarkably high percentage of lactic acid in the fermenting fodder.

The nitrates chiefly used in the practice of our invention are sodium nitrate and calcium nitrate. The aluminum salts of formic acid which, in particular, have a favorable preserving effect in combination with these nitrates, are those having a distinct acid reaction and being readily soluble in water, as aluminum triformate or the compounds containing formic acid, such as $(HCOO)_3Al.HCOOH$ and $(HCOO)_2AlCl.HCOOH$.

The mixtures may be spread over the green-fodder directly when this is being stored in the green-fodder-silo. It may in some cases be preferable, however, to give them an addition of diluents, in particular of salts having a strong osmotic action, as sodium chloride or ammonium chloride.

The following examples serve to illustrate the nature of this invention and how the same is to be carried out in practice, but the invention is not intended to be restricted to these examples.

Example 1

A blend of peas and vetches is charged in a container and 300 grams (per 100 kilograms of green-fodder) of a mixture of 20 parts of sodium nitrate, 16 parts of aluminum triformate, 34 parts of sodium chloride and 30 parts of ammonium chloride are added. The fermented fodder contains 2.9 per cent of lactic acid, 0.8 per cent of acetic acid and no butyric acid. The cattle are very fond of the fodder.

Example 2

A blend of after-clover and grass is charged in a container and 300 grams (per 100 kilograms of fodder) of a mixture of 20 parts of sodium nitrate, 20 parts of formic acid-aluminum triformate $(HCOO)_3Al.HCOOH$ and 60 parts of sodium chloride are added. The fermented fodder contains 2.3 per cent of lactic acid, 0.6 per cent of acetic and no butyric acid. The cattle are very fond of the fodder.

What we claim is:

1. A green-fodder preserving agent comprising a water-soluble nitrate and an aluminum salt of formic acid.
2. A green-fodder preserving agent comprising sodium nitrate and an aluminum salt of formic acid.
3. A green-fodder preserving agent comprising sodium nitrate and aluminum triformate.
4. A green-fodder preserving agent comprising sodium nitrate, aluminum triformate and sodium chloride.
5. A green-fodder preserving agent comprising sodium nitrate, aluminum triformate and ammonium chloride.

GEORG PFUETZER.
OSKAR FLIEG.

REFERENCES CITED

The following references are of record in the file of this patent:

UNITED STATES PATENTS

| Number | Name | Date |
|---|---|---|
| 2,022,139 | Meder et al. | Nov. 26, 1935 |
| 2,160,168 | Pfeiffer | May 30, 1939 |
| 2,298,514 | Stauf et al. | Oct. 13, 1942 |